United States Patent [19]

Webb

[11] Patent Number: 5,483,557
[45] Date of Patent: Jan. 9, 1996

[54] CHANNEL EQUALISATION IN PARTICULAR FOR FADING CHANNELS

[75] Inventor: William T. Webb, Southampton, England

[73] Assignee: British Telecommunications public limited company, London, England

[21] Appl. No.: 39,486

[22] PCT Filed: Oct. 30, 1991

[86] PCT No.: PCT/GB91/01900

§ 371 Date: Apr. 30, 1993

§ 102(e) Date: Apr. 30, 1993

[87] PCT Pub. No.: WO92/08298

PCT Pub. Date: May 14, 1992

[30] Foreign Application Priority Data

Oct. 30, 1990 [GB] United Kingdom .................... 9023605

[51] Int. Cl.$^6$ ..................................................... H04B 1/10
[52] U.S. Cl. ........................... 375/349; 375/229; 375/233
[58] Field of Search ..................................... 375/229–236, 375/267, 264, 286, 346, 347, 348, 349; 455/101, 52.1, 52.2, 52.3, 132–135

[56] References Cited

U.S. PATENT DOCUMENTS

| | | | |
|---|---|---|---|
| 4,899,367 | 2/1990 | Sampei | 375/39 |
| 5,065,411 | 11/1991 | Muto | 375/14 |

OTHER PUBLICATIONS

Issman et al, "Carrier Recovery for 16 Level QAM in Mobile Radio", IEEE Colloquim On Multi–Level Modulation 1990/045, pp. 9/1–9/8.
Webb et al, "16 Level Circular QAM Transmission Over a Rayleight Fading Channel", pp. 6/1–6/7.
Martin et al, "Multi–Level Data Transmission Over Mobile Radio Channels", Centre for Communications Research University of Bristol, pp. 2/1–2/10.
Webb et al, "Bandwidth Efficient QAM Schemes for Rayleigh Fading Channels", pp. 169–175.
Hodges et al, "Laboratory Testing of Digital Cellular Radio Systems", Br Telecom Technol J vol. 8, No. 1, Jan. 1990, pp. 57–66.
Devasirvatham, "A Comparison of Time Delay Spread Measurements within Two Dissimilar Office Buildings", Bell Communications Research, Inc., pp. 852–857.
Bultitude et al, "Propagation Characteristics on Microcellular Urban Mobile Radio Channels at 910 MHz", IEEE Journal On Selected Areas In Communications, vol. 7, No. 1, Jan. 1989, pp. 31–39.
Cox, "Delay Doppler Characteristics of Multipath Propagation at 910 MHz in a Suburban Mobile Radio Environment", IEEE Transactions On Antennas And Propagation, vol. AP–20, No. 5, Sep. 1972, pp. 625–635.
Steele et al, "Towards a High–Capacity Digital Cellular Mobile Radio System", IEEE Proc PT.F, vol. 132, No. 5, Aug. 1985, pp. 405–415.
Fujitsu—Scientific and Technical Journal, vol. 22, No. 4, 1986, Suzuki et al: "Multilevel QAM Digital Radio", pp. 294–306.
IEEE Transactions on Communications, vol. COM36, No. 5, Apr. 1988, New York, Fischer et al: "Wide–Band Packet Radio for Multipath Environments," pp. 564–576 PCT Search Report.

Primary Examiner—Stephen Chin
Assistant Examiner—Hai H. Phan
Attorney, Agent, or Firm—Nixon & Vanderhye

[57] ABSTRACT

A digital radio system is described in which data symbols are transmitted over a radio channel using multi-level modulation. A receiver receives the multi-level modulation signal and a first symbol estimator gives a first estimate of a symbol represented by the received multi-level modulation signal and a second estimator gives a second estimate of a symbol represented by said signal; the output of the first estimator is provided when the first and second outputs are the same or have a predetermined relationship and an output based on the output of the second estimator is provided otherwise.

10 Claims, 10 Drawing Sheets

| DELAY BIN | RECEIVED VOLTAGE | |
|---|---|---|
| | MICROCELL | STREET |
| 0 | 1 | 1 |
| 1 | 0.14 | 0 |
| 2 | 0.1 | 0 |
| 3 | 0 | 0.28 |
| 4 | 0 | 0 |
| 5 | 0 | 0 |
| 6 | 0 | 0 |
| 7 | 0 | 0 |
| 8 | 0 | 0.01 |

CHANNEL EQUALISATION IN PARTICULAR FOR FADING CHANNELS

BACKGROUND OF THE INVENTION

1. Field of the Invention

The present invention relates to digital radio, and in particular, though not exclusively to digital cellular radio.

2. Related Art

The form of modulation used in digital cellular radio systems depends on the radio environment in which a radio system is being used.

Binary modulation is usually preferred in wide area cellular radio systems as the cells tend to be large, forcing the radio communications to occur in the presence of low channel Signal-to-Noise Ratios (SNRs) and low signal-to-interference ratios. An advantage of binary modulation is that class-C amplification can be used, the high efficiency of which prolongs the life of battery portables compared to when linear amplification is used. As digital signal processing is essentially performed with bits, binary modulation is readily compatible with speech coding, channel coding and equalization.

Progressively, higher bit rates are being required of cellular radio systems. The transmitted bit rate can be increased by using multi-level modulation, where each symbol conveys more than one bit. Although the channel bandwidth need not be increased, many of the advantages associated with binary modulation cease. In particular, inefficient linear amplification is required, and the receiver must operate at high SNR levels. However, these difficulties become less significant if microcells or picocells are used. For these tiny cells, ranging from a kilometer along a motorway, to a 200 m section of a street to a single office, the radiated power may be below 10 mW and often of the order of a few microwatts. It is possible to operate in relatively high SNR environments, say in excell of 25 dB, and the inefficient linear amplifiers consume little battery power.

As many potential high bit rate communications may occur in office buildings, the capacity of mobile systems in these buildings must be very high. The high bit rates required to accommodate video, audio computer data and other traffic may necessitate the symbol rate of the multilevel systems being so high that the mobile radio channels exhibit dispersion. Performing equalization of multilevel signals e.g. multi-level Quadrature Amplitude Modulation (QAM), that are subjected to dispersion and fading is not an easy task.

A channel can be said to behave as a narrowband radio channel if the duration of the symbol transmitted is significantly greater than the delay spread of the channel. As a consequence, the received multipath signal is subjected to flat frequency facing. When the multipath signal has a dominant path Rician fading occurs. The worst case fading experienced in a narrowband channel is Rayleigh fading when very deep fades can occur, causing burst errors, even when the average SNR is high.

When the size of the cell is decreased the delay spread decreases, allowing an increase in the transmitted symbol rate whilst still maintaining flat fading conditions, i.e., avoiding the channel becoming dispersive resulting in Inter-Symbol Interference (ISI). As the cell size decreases to microcellular proportions, e.g., office microcells, the transmitted symbol rate may increase well above a mega-symbol/s.

However, even with very small microcells a point is reached when the delay spread becomes comparable with the symbol duration and ISI results. ISI can be combatted using symbol interleaving and channel coding. When the ISI becomes severe it is necessary to mitigate its effects by using channel equalization.

Many different types of equalizer systems are known. Almost all of them are designed to operate with binary modulation, rather than multi-level QAM. The major types of equalizers are linear (LE), decision feedback (DFE) and Viterbi. Usually the preferred equalizer is the Viterbi equalizer due to its theoretically optimal performance given perfect channel sounding, but unfortunately it is too complex for QAM as more than $2^{12}$ states are required.

Current QAM systems operate over fixed links, such as telephone wire circuits or point-to-point radio links, where the frequency selectivity is constant or changing very slowly compared to mobile channels. Generally a linear equalizer is adequate to overcome any ISI. The equalizer is normally made adaptive so that it automatically adjusts its tap coefficients as the channel dispersion changes. Occasionally DFEs are used which can also be adaptive.

SUMMARY OF THE INVENTION

According to a first aspect the invention provides a digital radio system in which data symbols are transmitted over a radio channel using plural modulation levels, comprising a receiver for receiving a plural-level modulation signal in which the received signal is processed by a first symbol estimator which gives a first estimate of a symbol represented by a received plural modulation level and by a second estimator which gives a second estimate of a symbol represented by said signal and the output of the first estimator is provided when the first and second outputs are the same or have a predetermined relationship and an output based on the output of the second estimator is provided otherwise.

According to a second aspect the invention provides a method of processing received plural-level modulation signal in which the received signal is processed by a first symbol estimator which gives a first estimate of a symbol represented by a received plural modulation level signal and by a second estimator which gives a second estimate of a symbol represented by said signal and the output of the first estimator is provided when the first and second outputs are the same or have a predetermined relationship and an output based on the output of the second estimator is provided otherwise.

According to a third aspect the invention provides a method of processing received plural-level modulation signals representing digital data symbols in a digital radio system, comprising: making a first estimate of a symbol represented by a received plural modulation level signal and making a second estimate of a symbol represented by said signal and providing as an output the first estimate when the first and second estimates are the same or have a predetermined relationship and the second estimate otherwise.

BRIEF DESCRIPTION OF THE DRAWINGS

A preferred embodiment of the invention will now be described by way of example and with reference to the accompanying drawings, wherein.

DETAILED DESCRIPTION OF EXEMPLARY EMBODIMENTS OF THE INVENTION

Figures 1, 3:
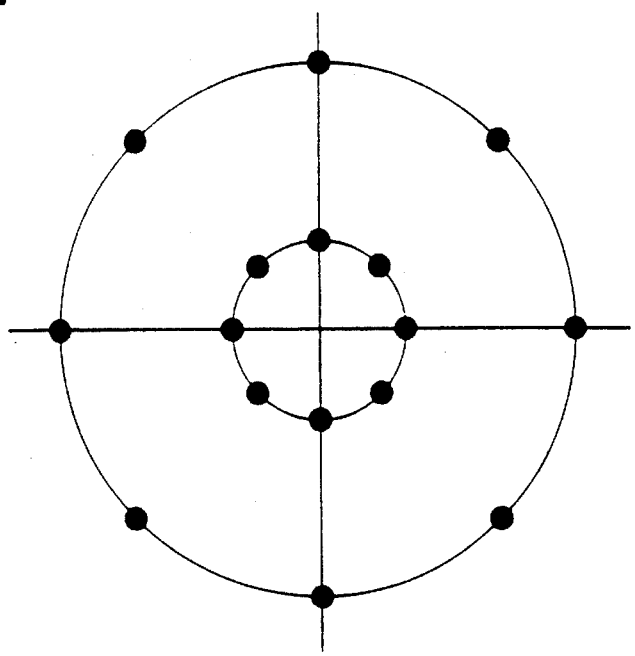
FIG. 1 is a diagram of a multi-level QAM constellation used in the preferred embodiment of the invention.
FIG. 3 is a table 1, listing as an illustrative example only channel sounding data.

Referring initially to FIG. 1, the preferred embodiment of the invention will be described in relation to a multi level QAM scheme having a constellation of phase and amplitude as illustrated in FIG. 1. Other constellations can, of course, be envisaged, but that FIG. 1 is used for illustrative purposes here.

Figure 2:
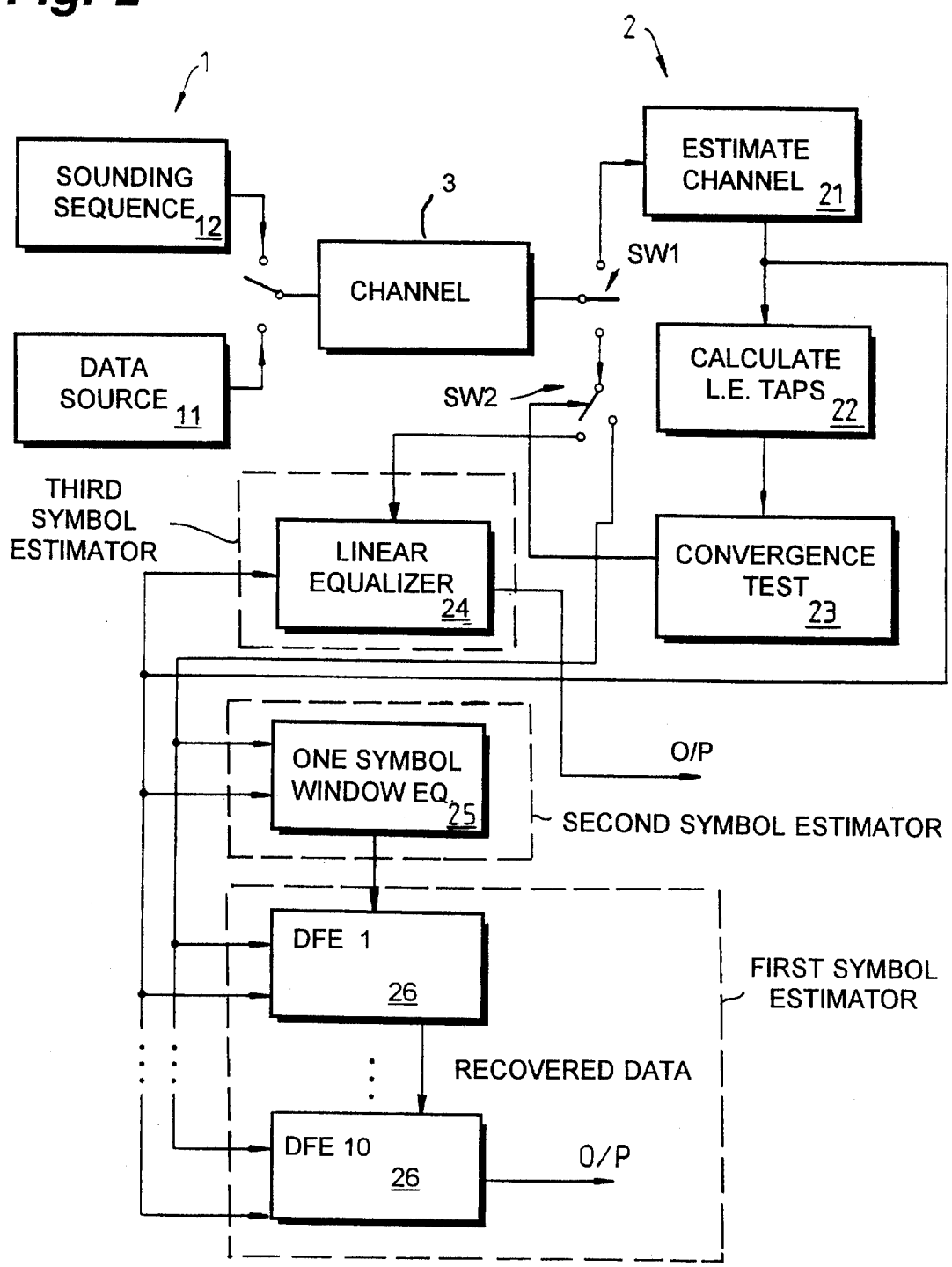
FIG. 2 is a general schematic block diagram of a system according to the preferred embodiment of the invention.

Referring now to FIG. 2, the preferred embodiment of the invention provides a digital mobile radio system having a transmitting part 1 and receiving part 2. Signals from the transmitting part 1 are sent over a channel 3, i.e. a radio channel, to the receiving part 2. Although a single unidirectional channel system is illustrate, the system may be multi-channel and bi-directional as required, and is already well known.

The transmitting part 1 of the system, has a data source 11, and a channel sounding sequence source 12. The data source 11 may, for example, be encoded digital voice data.

The receiving part 2 of the system has a data recovery section illustrated in FIG. 2 which provides an output (o/p) to necessary decoding section etc. (not shown). The preferred embodiment of the invention is particularly concerned with the data recovery section illustrated in FIG. 2 and decoding sections etc. may be provided in any suitable manner as is known to those skilled in the art.

It will be appreciated that the transmitting part 1 and receiving part 2 will include such sub-systems as are necessary to provide and to receive the radio signal for transmission over the radio channel 3, as will be understood by a person skilled in the art.

The data recovery section of the receiving part 2, as illustrated in FIG. 2, comprises a first switch SW1 for selectively providing an input signal received from the channel 3 to a channel estimator 21 and a second switch SW2. The channel estimator 21 provides an output to Linear Equalizer (LE) tap calculator 22 which in turn provides an output to a convergence tester 23. The second switch SW2 selectively connects the input signal from channel 3 (via switch SW1) to either a Linear Equalizer (LE) 24, or to One Symbol Window Equalizer (OSWE) 25 and an array of Decision Feedback Equalizers (DFEs) 26-1 to 26-10. The second switch SW2 is operated under the control of Convergence Tester 23. The output of Channel Estimator 21 is provided additionally to Linear Equalizer 24, and to One Symbol Window Equalizer 25 and Decision Feedback Equalizers 26-1 to 26-10 (if, for example, ten successively utilized separate DFEs are used rather than the alternative of making ten iterative loops through a single DFE. The One Symbol Window Equalizer (OSWE) 25, is constituted by a RAKE combiner. The data recovery section provides an output from LE24 or DFE10 (26-10) depending on whether switch SW2 is set to provide incoming signals to LE24 or OSWE 25 and DFEs 1 to 10 (26-10). A first symbol estimator (a differential feed equalizer, e.g., DFEs 1 to 10) gives a first estimate of a symbol represented by a received plural modulation signal and a second symbol estimator (a modified RAKE diversity combiner, e.g, OSWE 25) gives a second estimate of the symbol represented by the same received plural modulation signal. The output of the first symbol estimator (i.e., the DFEs) is provided when the outputs of the first and second symbol estimators are the same or have a predetermined relationship. Otherwise, the second symbol estimator output is provided. A third symbol estimator (a linear equalizer, e.g., Linear Equalizer 24) also may be arranged to provide the output when the received signals indicate a particular characteristic of the radio channel (e.g., when channel sounding signals provide a convergent series of values for the taps of the linear equalizer).

Linear Equalizers (LEs) and Decision Feedback Equalizers are well known, but to assist in understanding their operation in the context of the invention, each is described below. Also a functional description of the One Symbol Window Equalizer (OSWE) is given below, together with a general description of a RAKE combiner on which the OSWE is based. The inter-operation of the LE, DFEs and OSWE in the preferred embodiment of the invention is then explained.

Linear Equalizer

Figure 4:
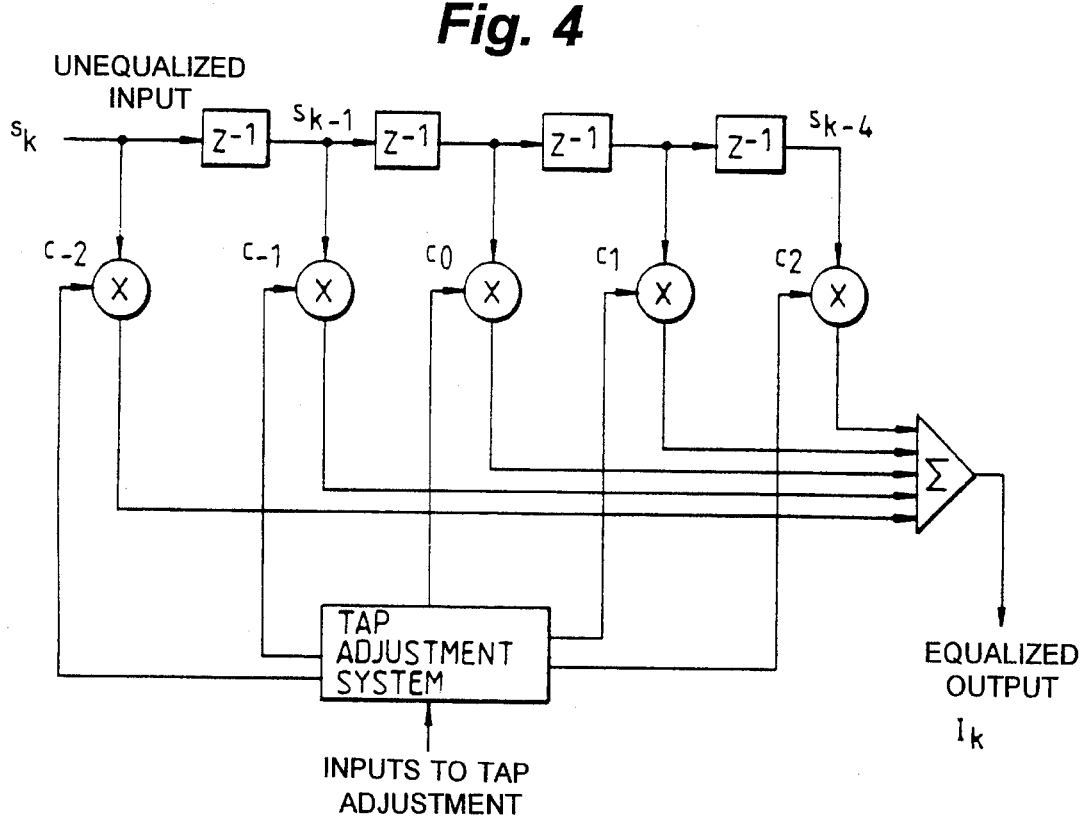
FIG. 4 is a schematic diagram illustrating a linear equalizer (LE) which forms part of the embodiment.

The basic structure of a linear equalizer (LE) system is given in FIG. 4. The received signal $s_k$ is passed through a delay chain and the output $I_k$ derived by a multiplication using taps with variable coefficients $c_n$. Thus $$I_k = \sum_{j=-K}^{K} c_j s_{k-j} \qquad (3)$$

where there are $(2K+1)$ taps. For convenience we have $K=2$ in FIG. 4. There are numerous ways of deriving the coefficients $c_k$. If the channel impulse response is time invariant then the coefficients are constant. In most cases, however, the channel impulse response is time variant and so the tap coefficients need to be variable. A large class of linear equalizers adjust these coefficients by comparing the equalised output with the nearest constellation point and adjusting the coefficients so as to reduce the error. A form of least squares algorithm is normally used in making these adjustments. This is adequate for slowly varying channels with low BERs. If the BER exceeds a certain threshold then catastrophic failure will occur due to the wrong symbol being decoded and hence the wrong adjustment being applied to the tap coefficients. These maladjusted coefficients further distort the signal increasing the probability of error, and so on until complete failure ensues.

Robustness can be increased by the regular use of a training sequence to ensure the coefficient values are close to optimum. For example, data can be divided into blocks, and at the start of each block a known sequence is transmitted. This method can be further subdivided into convergence training and channel sounding depending on the known sequence transmitted and the processing at the receiver. In convergence training, any known sequence can be sent. Because the receiver knows this sequence there can be no decoding error during the period and so the coefficients can be driven towards the optimal value with little risk of catastrophic failure. During normal data transmission the coefficients can either be left unchanged, or updated according to a more cautious update rule compared to that used during the training period.

Another way that the transmission of a known sequence can be used is to periodically sound the channel and then set the coefficients accordingly, eliminating the need for complicated convergence algorithms. The channel may be sounded by sending a maximal length pseudo random binary sequence (PRBS) as the known sequence, and correlating it against a replica of itself held in the receiver for each of the symbol intervals over which the expected delay spread of the incoming signal occurs. Maximal length PRBSs have the property that the amplitude of the autocorrelation function with zero delay is equal to the length of the code, but for any offset delay the autocorrelation function is equal to −1. The autocorrelation is performed with the XOR function giving a result of either 1 or −1 (as compared to 1 to 0). This is our preferred system, as even if the channel is in a deep fade during sounding we are at least aware of this and can take countermeasures. Once we have sounded the channel we can calculate the tap coefficients for the LE. The optimal coefficients for an infinite length LE are the values of the inverse filter. If the baseband equivalent transmitted signal is x, and the baseband impulse response of the channel is g, then the baseband equivalent input to our receiver is $$y = g * x \tag{4}$$

where * symbolises convolution. An equalizer at the receiver having an impulse response c results in an equalized output $$c * y = c * g * x \tag{5}$$

which, to be equal to the input x, requires $$c * g = \delta \tag{6}$$

where $\delta$ is the unit pulse sequence $[1,0,0,\ldots]$. Applying the Z-transform to Equation 6 gives the Z-transform of the filter required to equalize the channel having a Z-transform of G(z) as $$C(z) = \frac{1}{G(z)} \tag{7}$$

In practice the channel response is of finite length and we represent it by $$G(z) = g(0) + g(1)z^{-1} + \ldots + g(n)z^{-n} \tag{8}$$

where $g(0), g(1) \ldots g(n)$ are filter coefficients. Its inverse filter has a z-transform $$C(z) = \frac{1}{g(0) + g(1)z^{-1} + \ldots + g(n)z^{-n}} \tag{9}$$

$$C(z) = c(0) + c(1)z^{-1} + c(2)z^{-2} + \ldots$$

where $c(0), c(1) \ldots$ form an infinite length sequence of equalizer coefficients. If the ISI is mild then this sequence will decay quickly and the equalizer coefficients, i.e. $c(n)$, are insignificant for large n. In microcells the ISI generally fulfils this criteria and we can set the coefficients, $c(n)$, of the LE by this long division process of $1/G(z)$ which requires little computational effort and is implemented in real time. Thus, it our channel filter has response $$G(z) = g(0) + g(1)z^{-1} + \ldots + g(n)z^{-n} \tag{10}$$

where $g(n)$ is a complex number then the complex equalizer coefficients $$c_0 = 1/g(0)$$

$$c_1 = (-c_0 \times g(1))/g(0)$$

$$c2 = ((-c_0 \times g(2)) + (-c_1 \times g(1)))/g(0)$$

and generally $$c_n = \frac{\sum_{i=0}^{n-1} (-c_i \times g(n-i))}{g(0)} \tag{11}$$

This system of sending a known sequence periodically, exhibits improved performance at the cost of increased bandwidth but problems can be experienced with the convergence system if the channel changes during training, making it hard for the convergence algorithm to work.

If there is no single dominant path in the impulse response, such as would be the case with the impulse responses of Table 1 (FIG. 3) when the first path was subject to a 10 dB fade, then the coefficients of the LE may fail to decay for a reasonable value of n. In this case the coefficients calculated by this long division method are no longer the optimal coefficients for the finite length equalizer. Although optimal values for the coefficients for the finite length equalizer can be found by more complex processes [11] the linear equalizer is no longer suitable. Simulations of a LE having ten taps with the first path of the indoor impulse response subjected to a fade, and the tap coefficients set optimally for the finite length equalizer, showed that the LE did not perform satisfactorily, and further the process of calculating the coefficients required considerable processing time.

Decision Feedback Equalizer (DFE)

Figure 5:
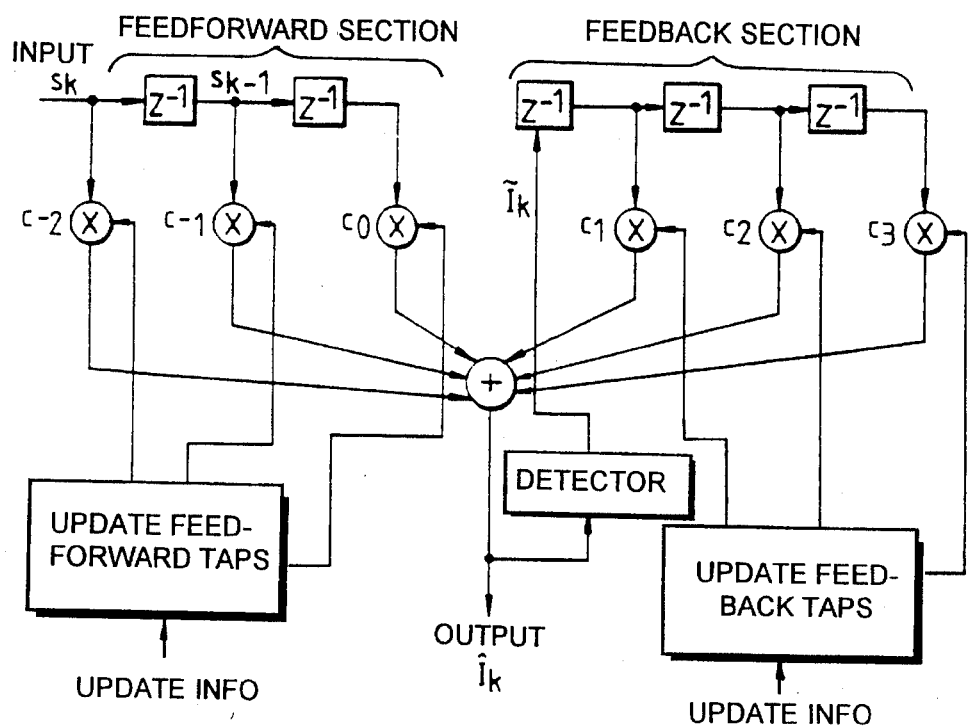
FIG. 5 is a schematic diagram illustrating a decision feed back (DFE) equalizer which forms part of the preferred embodiment.

The structure of a general DFE is shown in FIG. 5. Its operation is modelled by $$\hat{I}_k = \sum_{j=-K_1}^{0} c_j s_{k-j} + \sum_{j=1}^{K_2} c_j \tilde{I}_{k-j} \tag{12}$$

where $\hat{I}$ is the output and $\tilde{I}$ is the decision made by the receiver as to the symbol transmitted, normally the symbol closest to the decoded output. The equalizer is composed of a feedforward and feedback section. The feedforward section is identical to the linear equalizer but the feedback section differs in its input. Instead of using the receiver input signal, a decision is made as to the transmitted symbol, and this value is passed into the feedback section. This leads to a number of advantages. The data passes into the feedback section no longer contains any noise, thus increasing the accuracy of the interference cancellation. Also the structure of the feedback system means that the length of the feedback register need only be as long as the delay spread of the incoming signal. This is in contrast to the linear equalizer where the length is governed by the inverse filter response and can easily be an order of magnitude greater than the delay spread. Coefficient adjustment is similar to the linear equalizer, the difference between the output and the nearest symbol can be used to update the taps, or a training sequence can be used. If the channel is sounded then the correct feedback tap coefficients are simply the sampled values of the channel impulse response. The coefficients in the feedforward section still need to be derived using the process of inverse filtering, but in practice the feedforward section is rarely necessary in DFEs as the impulse response normally consists of a rapid rise to a peak followed by a relatively long decline.

Given a low BER, the performance of the DFE will normally be superior to the linear equalizer, due to the removal of nose on the feedback input and the untruncated length of the feedback system. The DFE, however, is considerably more prone to catastrophic failure than the linear equalizer. It still has the same problems of incorrect coefficient updating, but in addition there is the possibility of incorrect feedback. If an incorrect decision is made then the interference cancellation signal from the feedback section will be incorrect which will increase the probability of error when making the next decision, and so on. Furthermore, the DFE will generally be unable to recover from such a failure when the signal improves as it will be almost impossible to get the correct signal back into the feedback register. This generally renders the DFE unsuitable for use in Rayleigh fading channels as it will fail catastrophically during the first fade and then be unable to recover until the next training sequence is sent.

Effects of Rayleigh Fading

When transmitting in the Rayleigh fading environment, there are a number of countermeasures that are often employed against fading. Mobile subscribers may become stationary in a deep fade with consequent system failure. To combat this condition frequency hopping can be used. The data is divided into blocks, and at the end of each block a hop is made to a new frequency outside the coherence bandwidth of the channel. The channel is sounded at the start of the block to establish the impulse response at the new frequency. Although sounding in the centre of the block will give better results, it requires more memory and for simplicity is not performed here. The next block of data is then sent. The size of each block must be chosen so that the channel does not change significantly during the time the block is transmitted. However, the channel should be sounded as infrequently as possible to keep the data throughput high. The optimum block size is related to the mobile speed.

Simulations of adaptive linear and DFEs showed very poor performance due to catastrophic failure as discussed previously. A similar problem was experienced with DFEs employing channel sounding. The linear equalizer with channel sounding offered the most promising performance.

Figure 8:
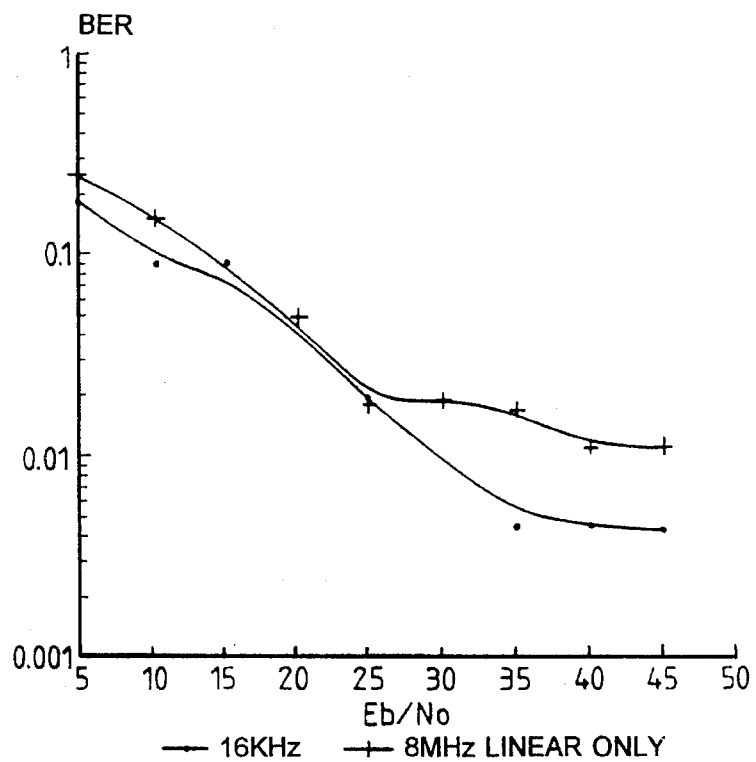
FIG. 8 shows a graph illustrating BER performance of narrow band and broad band QAM.

A few small changes to the channel sounding method used for binary modulation schemes are necessary for QAM as we need to map a PRBS onto the outermost symbol of the constellation of 0 degrees. The use of the outermost symbol maximises received SNR and by only transmitting on the I axis measurement of the introduced phase shift is simplified. Separate correlation on both the I and Q axes is performed, and the phase shift is found by taking the arctan of the results. The underlying QAM system we use is the differential Star system [4]. We do not use oversampling [4] as the channel does not change rapidly at these high transmission rates of 8M Sym/s, and we do not use the 64-level coded system [4] as we wish to keep the complexity low for these initial simulations. The comparable narrowband system is the differential 16-level Star without oversampling. A comparison of the BER performance of the differential 16-level Star operating at 16 kHz over flat-fading, i.e. narrowband channel and 8 MHz system with a LE over a frequency selective wideband channel is presented in FIG. 8 where we notice that the performance of the wideband system is inferior to the narrowband system, but not substantially so.

Operation of LEs and DFEs

It was observed in our simulations that the performance of a system with the linear equalizer could be considerably improved if it could be made more tolerant to certain fades. Also it was observed that the DFE could be a very powerful equalizer if it could be prevented from failing catastrophically due to error propagation effects. A way forward was to conceive an equalizer which utilized the advantages of both the LE and DFE but avoided their shortcomings.

The linear equalizer works satisfactorily most of the time, as previously described, except when the coefficients fail to decay. This failure to decay could be detected by comparing the values of the last few coefficients against an appropriate threshold value. If this threshold value was exceeded by the coefficient values, the decoded data from the linear equalizer would have a high error rate. A system which would not fail catastrophically during fades was required. The system need not perform particularly well as the previous systems have a BER of almost 0.5 under these conditions.

In the situation where the LE failed to converge, it was decided to attempt to use a DFE which was constrained in some manner in order to prevent catastrophic failure. The first pass at equalizing the channel is made by a non-optimal equalizer based on a RAKE equalizer or combiner [11]. Although this will make a large number of errors these will generally be in neighbouring constellation points. The regenerated data can then be used to keep the DFE from failing catastrophically. We call this non-optimal equalizer a one symbol window equalizer (OSWE).

RAKE Combiner

Figure 6:
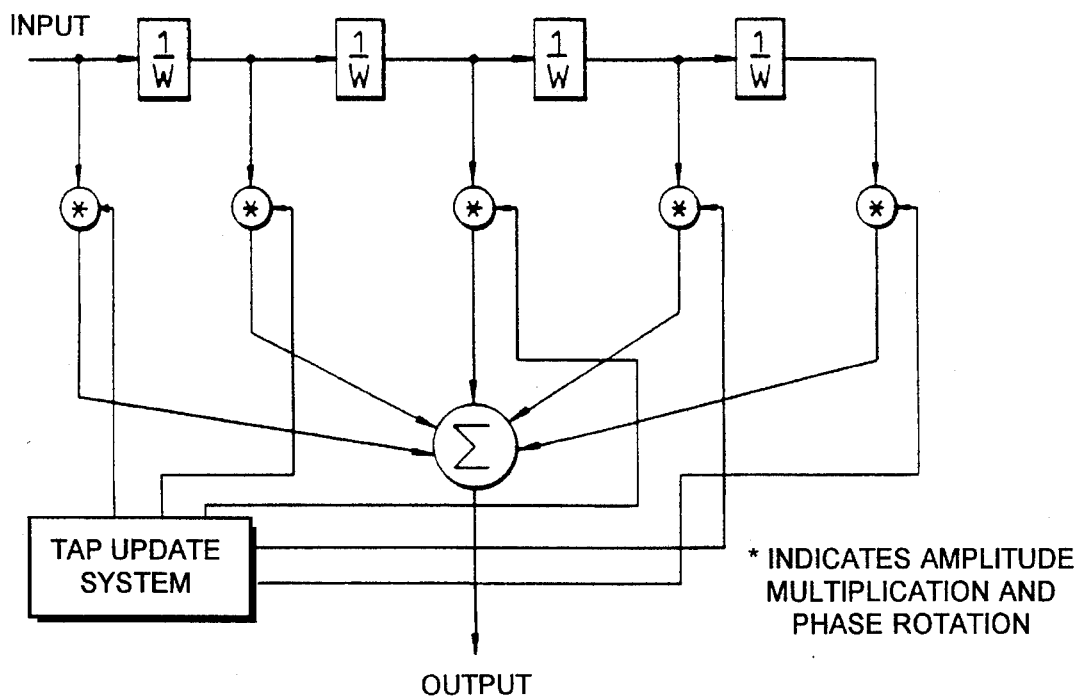
FIG. 6 is a schematic diagram illustrating a diversity combining system which forms part of the present invention.
Figure 7:
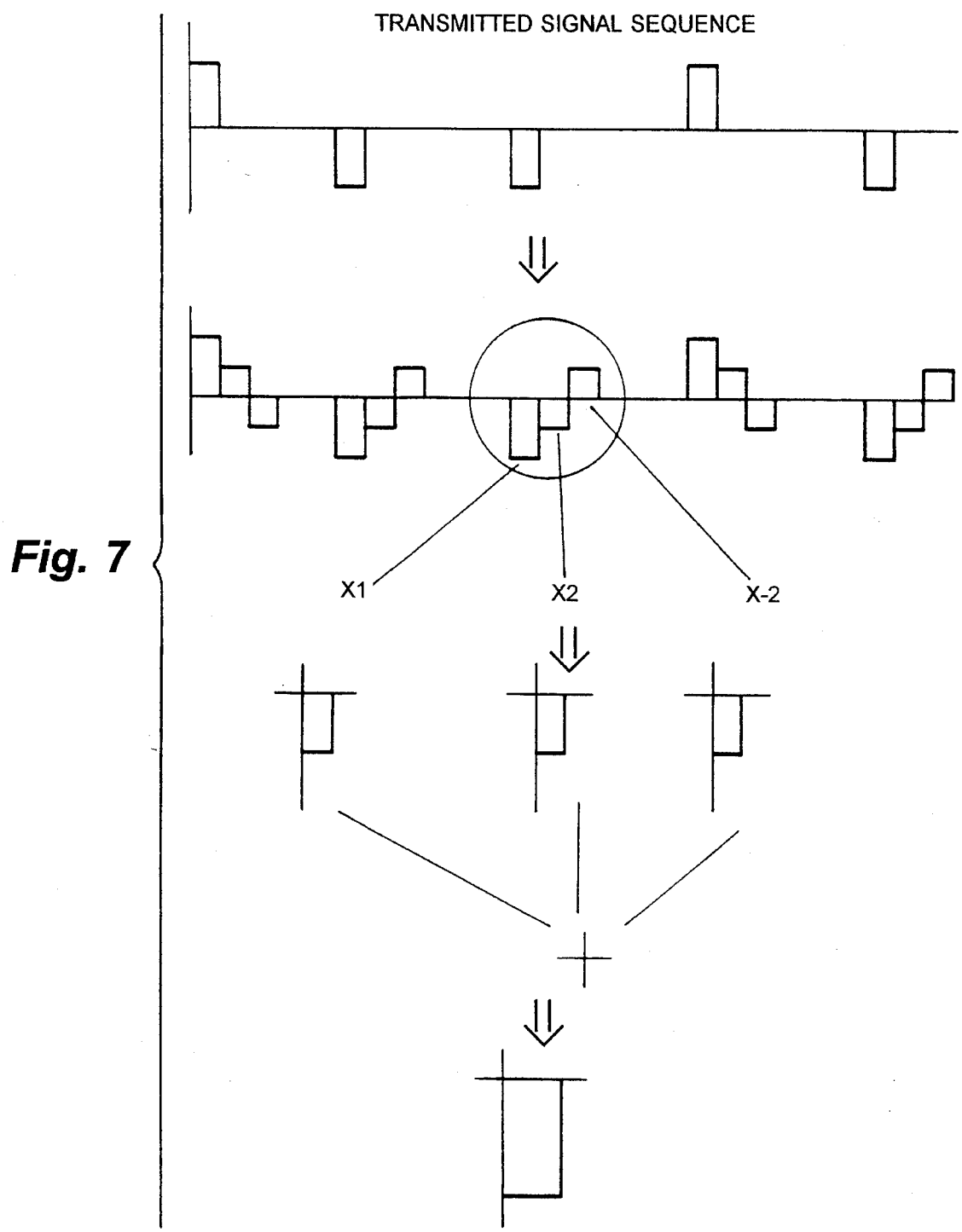
FIG. 7 is a diagram illustrating the operation of the RAKE combiner of FIG. 6.

The RAKE system is not an equalizer, but a combiner for diversity systems. A block diagram of the basic system is shown in FIG. 6. The RAKE system is identical in structure to a maximum ratio combiner. It is designed to work in a situation where the signal to be transmitted is narrowband, but the bandwidth available is wideband, and so the transmitted signal is made wideband in order to use the multipath diversity inherent in the wideband system. The baseband signal is transmitted as a series of narrow pulses with a gap between each pulse as shown in FIG. 7. Because of the delay spread, the receiver perceives each pulse as a series of incoming pulses. In order to work correctly it needs to know the expected attenuation and phase change suffered by each path. Each incoming pulse is then amplified and derotated by these expected factors, and then the pulses are added together to form the input to the symbol decision section. This is shown diagramatically in FIG. 7. Adaptive coefficient update systems can be used instead of channel sounding methods, but these tend to be less robust.

The RAKE system gets its name from the way it "rakes" in all the incoming pulses to form one signal. It is rarely used due to the superiority of channel coding methods coupled with equalizers to exploit extra bandwidth.

One Symbol Window Equalizer (OSWE)

Figure 10:
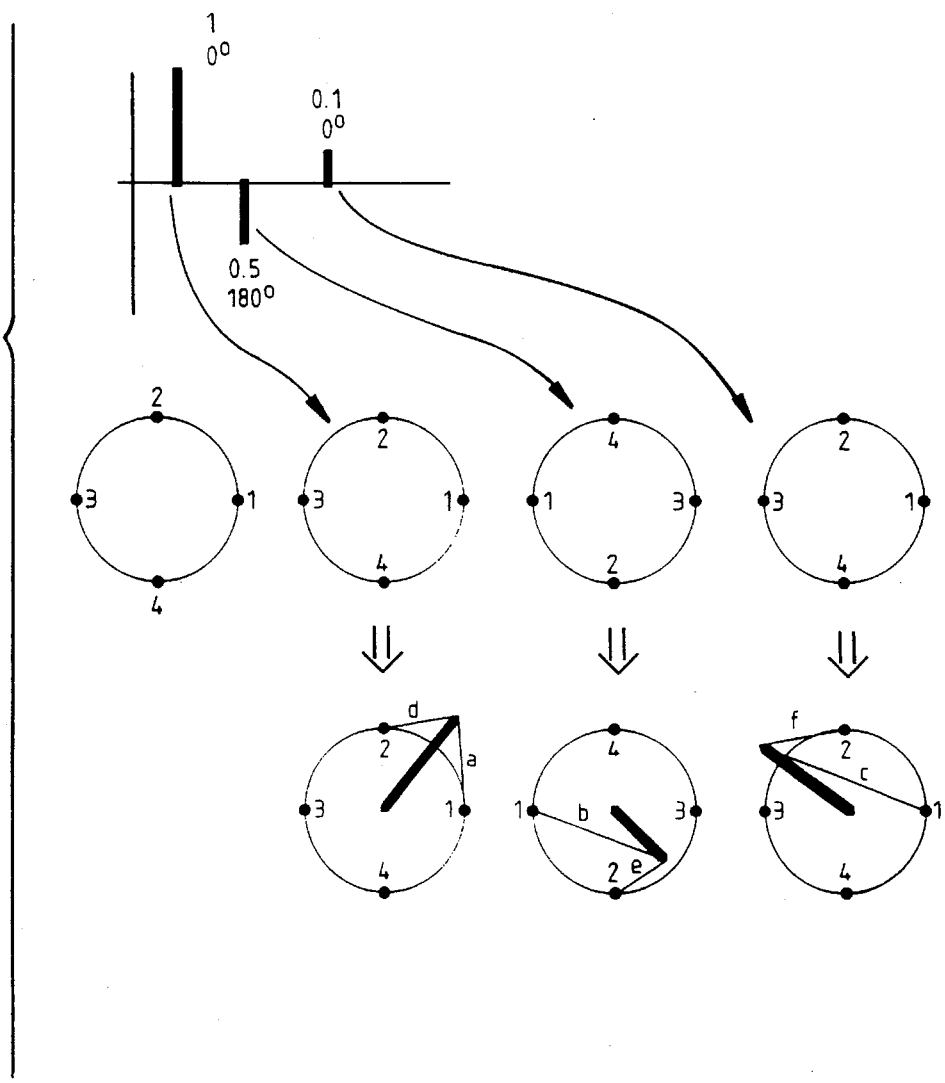
FIG. 10 illustrates the operation of the one window symbol equalizer constituted by the RAKE combiner.

The equalizer utilizes the principle that the ISI will generally appear as random noise and calculating an appropriately weighted average of the magnitude and phase of the incoming phasors over the duration of the channel impulse response will enable us to remote this ISI. Its principle of operation is discussed below and shown diagrammatically in FIG. 10. First we estimate channel impulse response from the sounding sequence. Next we determine the delay bin, m symbol periods after the first significant component, in which the last significant path component was received. For each of the m bins we rotate a copy of the transmitted constellation by the measured rotation of the impulse response for that bin and hold it in memory. By this means we compensate for any rotation of the constellation caused by the channel. To make a decision as to the rth symbol we wait until we have received all m incoming QAM phasors which include a contribution from the rth symbol. We map these phasors onto the appropriate rotated constellation. Thus the QAM phasor due to the first path signal is held with the constellation rotated by the phase shift of the first path. The QAM phasor comprising the first path from the (r+1)th symbol transmitted and ISI from the rth symbol would be held with the constellation rotated by the phase shift the channel imposes on the second bin delay, and so on. Then for each of the M possible transmitted phasors we carry out a distance summation over all rotated constellations. Specifically the distance between the point on each rotated constellation to which the Mth phasor has been mapped and the received symbol are found. Each distance is scaled by the ratio of the path amplitude for that delay to the path amplitude of the main tap. This scaling has the effect of reducing the importance of significantly attenuated delayed signals when regenerating the symbol and is necessary as these delayed signals will be highly corrupted by the noise and ISI from other symbols.

The distance $d_n$ associated with any particular symbol $S_n$ at time t is given by $$d_n = \sum_{i=1}^{m} \sqrt{(x_{t+i} - u_i)^2 + (y_{t+i} - v_i)^2} \times \frac{a_i}{a_o} \quad (13)$$

where m is the last significant delay bin, $x_t$ and $y_t$ are the cartesian values of the incoming signal at time t, $a_i$ and $a_o$ are the amplitudes of the measure impulse response at tap i and of the maintap respectively, and u and v are the cartesian values of the rotated constellation points and are given by $$u_i = r_n \cos(\theta_n + \phi_i)$$

$$v_i = r_n \sin(\theta_n - \phi_i) \quad (14)$$

$r_n$ and $\theta_n$ are the polar amplitude and phase associated with symbol n at the transmitter, and $\phi_i$ is the phase shift of the ith component in the estimated channel impulse response.

After having found the total distance from all the m received phasors which include components of the rth signal to each of the M constellation points, we then select the constellation point with the lowest total distance i.e. the smallest value of d, as the most likely one to have been transmitted. This symbol along with the actual received signal levels $x_t$ and $y_t$ is passed to the DFE.

Operation of OSWE With DFE

Figure 9:
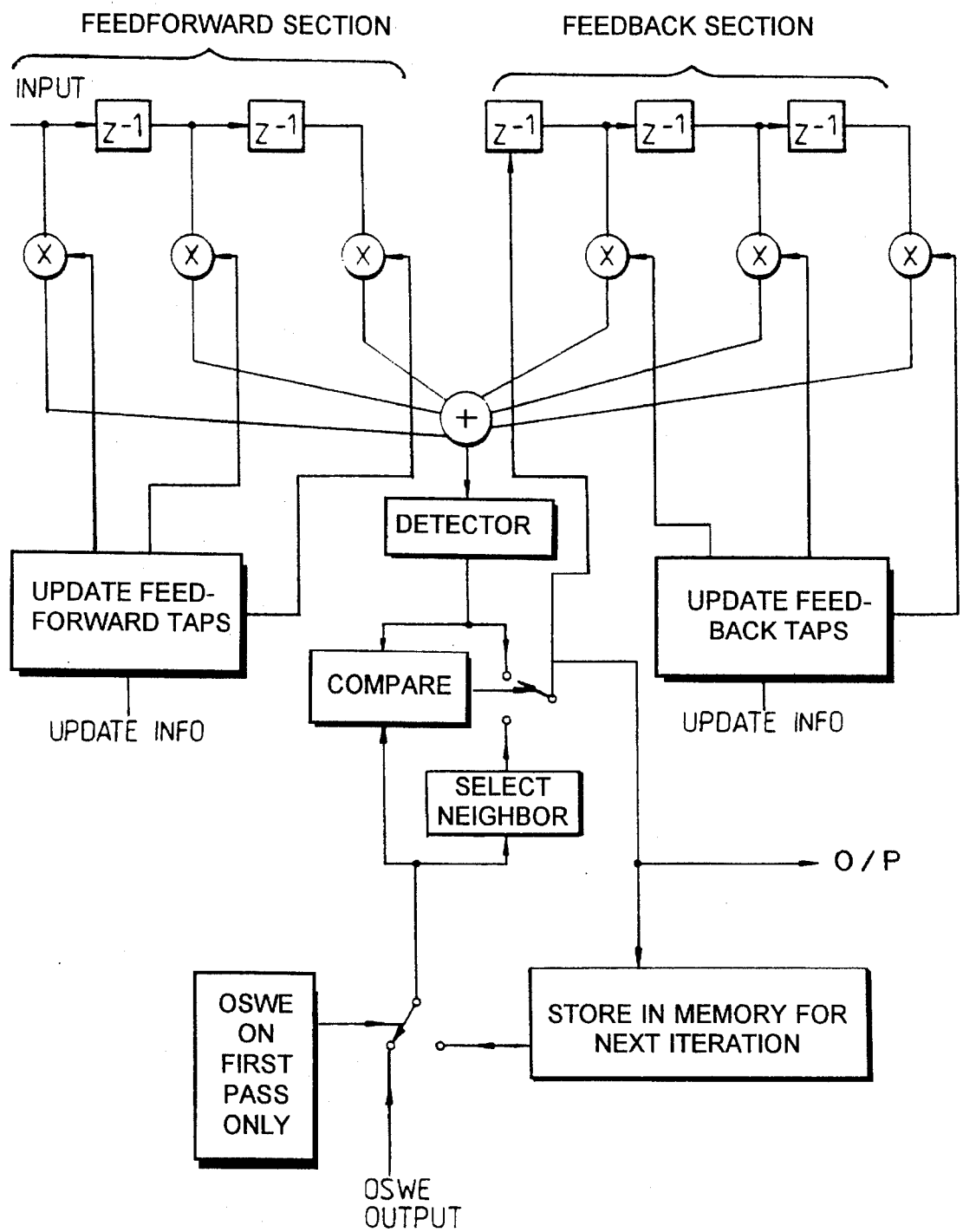
FIG. 9 is a diagram illustrating the interworking of the DFE and RAKE combiner.

We now use the power of the DFE to significantly reduce the error rate from the OSWE (as shown in FIG. 9). When the LE coefficients have failed to decay, the DFE acts on the received signal level as per normal and decides on the transmitted symbol. If this decision concurs with that of the OSWE the symbol is input to the feedback taps and is stored in a decision register maintained for the duration of the decoding of one block. If it is a neighbouring symbol in the QAM constellation to the one decoded by the OSWE then we again pass the symbol decoded by the DFE back to the feedback taps and store it as the new decoded symbol. However, should the DFE regenerated symbol not be a neighbor of the OSWE estimated symbol we change the OSWE estimated symbol to one of its neighbours in such a way that it is moved nearer to the symbol position regenerated by the DFE, input it to the DFE feedback taps and store it as the new decoded symbol.

This restriction on the symbols fed back by the DFE prevents it from failing catastrophically in all but the most severe fades. The DFE can be iteratively run a number of times using the same input signals but different feedback signals as the constraining output register changes slightly on each pass. Simulations revealed that for a very high percentage of the times when the LE failed completely, this iterative system produced a very low or zero symbol error rate. Using a knowledge of the transmitted symbol in the simulation showed each iteration produced a lower or identical BER than the previous iteration. After approximately ten iterations a minimum BER is reached.

The OSWE will automatically operate on the strongest component in the channel impulse response. DFEs normally have a feedforward section to allow for the strongest component not being the first path. This feedforward section is essentially a LE and the tap coefficients are set by the inverse filter process as previously explained. With the combination of equalizers proposed here, we can remove most of the feedforward section as the OSWE has already decoded the data that would normally be decoded in the feedforward part of the DFE. The DFE operates no the untampered OSWE output, the incoming signal and the feedback data derived as previously explained. This equalizer does not have such good iterative convergence properties when the first path is the strongest, as it has to use data from the OSWE before it can modify it, but again it shows a significant improvement in performance over the LE.

Figure 11:
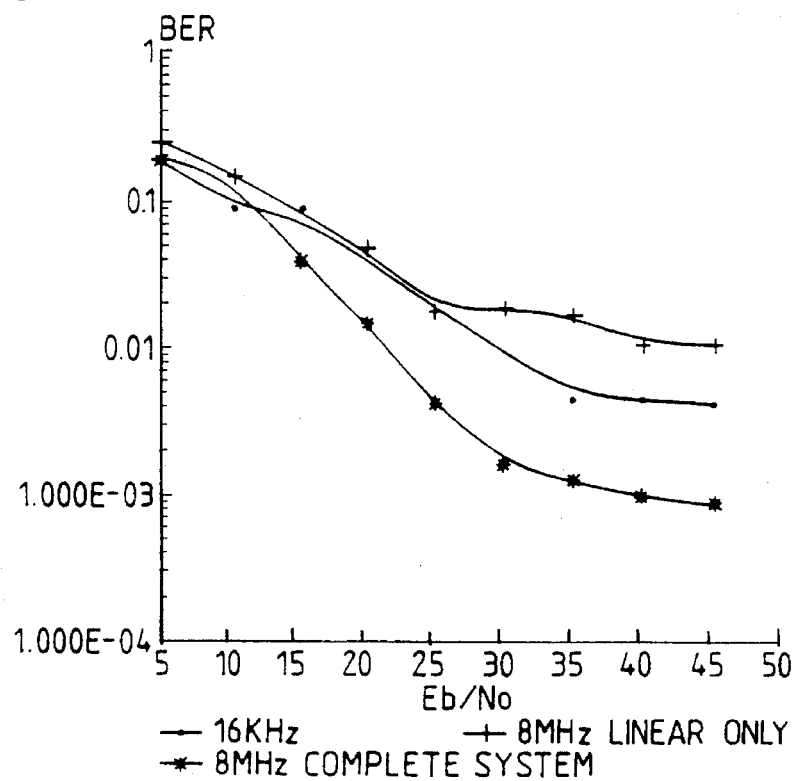
FIG. 11 is a graph illustrating BER performance with various additional coding schemes.

The results for this system are shown in FIG. 11 where we see that the performance is significantly better than the LE alone, and also an improvement on the narrowband system. This improvement over the narrowband system is because this equalizer is successfully using the inherent multipath time-diversity present in the wideband channel.

Use of Error Correction Coding

The results shown in FIG. 11 show the presence of a residual BER caused by impulse responses which cannot be equalized satisfactorily by our system. For example, for the indoor environment, the system fails when the first component in the channel impulse response is in a fade of about 10 dB, when its magnitude becomes approximately equal to that of the other multipaths.

Figure 12:
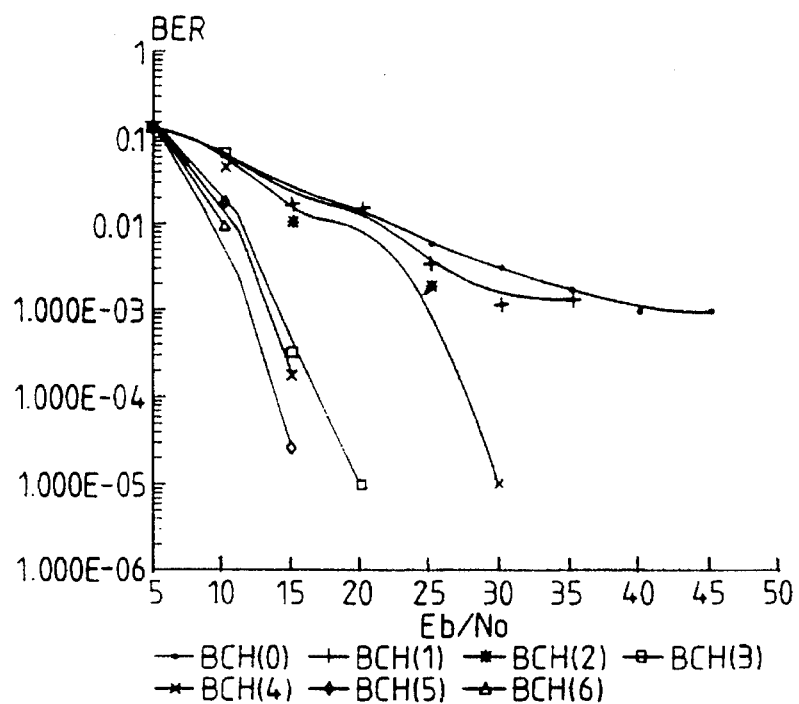
FIG. 12 is a graph illustrating BER performance of the system of the preferred embodiment.

To overcome the residual BER we sought to utilize error correction coding in an efficient manner. Conventional FECs code the bits, interleave them, transmit them, perform equalization, deinterleave the bits and then decode and correct them. The results of such an FEC strategy overlaid onto the system of the preferred embodiment are shown in FIG. 12. We have opted for BCH codes. This is because they are systematic, which has the advantageous property that they can detect when they have become overloaded by error whence they do not attempt any corrections. In this situation they do not introduce any further errors. BCH codes are not as efficient as RS codes, but are considerably simpler to implement. In reference [4] we compared RS and BCH codes for QAM transmissions over mobile radio channels and concluded that the small gains of the RS codes over the BCH codes were not sufficient to justify the increase in complexity required. In FIG. 12 we show the results for a range of error correction powers. The numbers in brackets in the key to the Figure indicate the bit correction ability for a block length of 63 bits.

As can be seen, even mild error correcting powers proved to be effective, particularly with SNRs in excess of about 20 dB. The residual BER is removed and the channel is rendered suitable for computer data transmission. Coding powers in excess of the BCH(63, 45, 3) offer little extra gain for the trade off in spectral efficiency. We note that coding reduces spectral efficiency but it has proved necessary to take this measure in most transmissions over Rayleigh fading channels.

Figure 13:
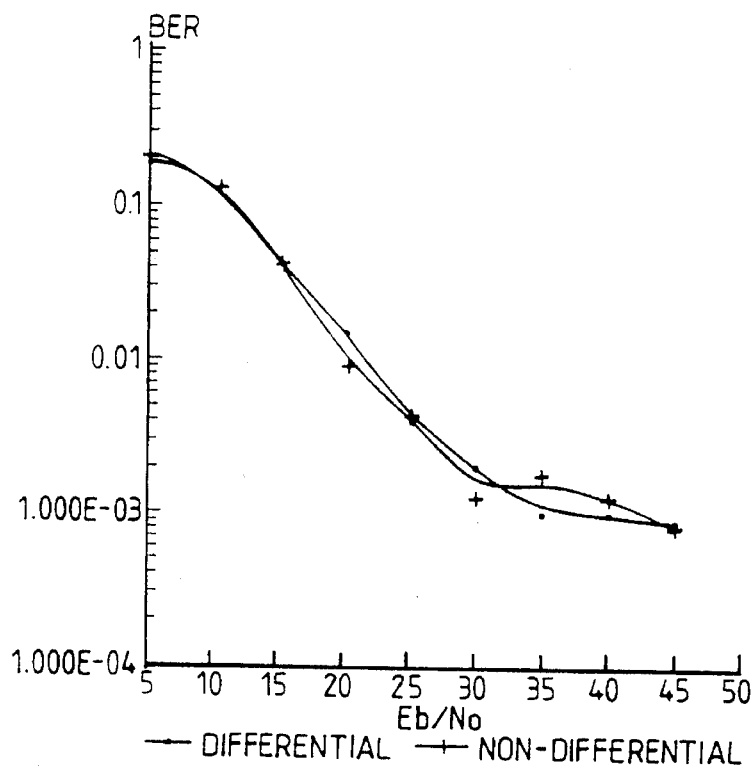
FIG. 13 is a graph illustrating BER performance with and without differential coding.
Figure 14:
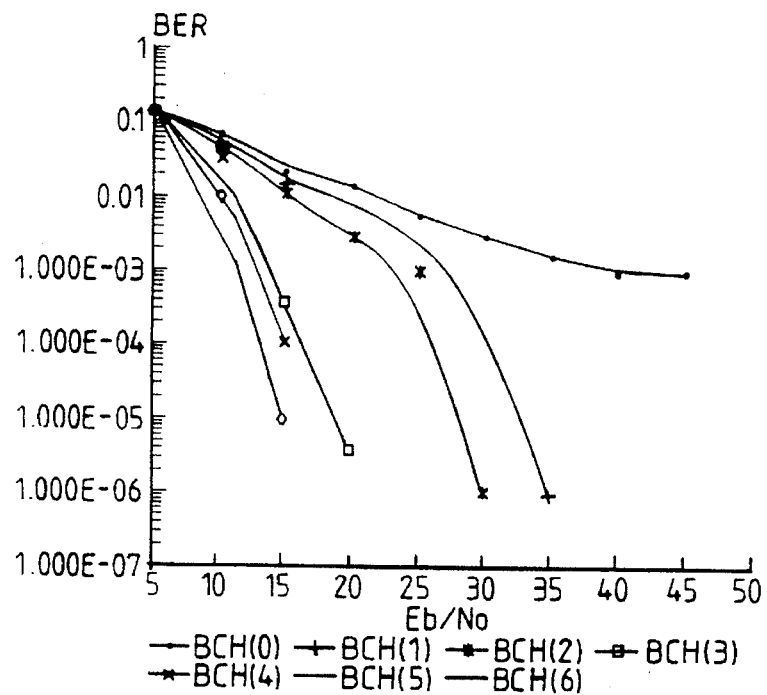
FIG. 14 is a graph illustrating BER performance for various iterative coding schemes.

With the system of the preferred embodiment error correction codes can be used in a more efficient manner than by merely decoding after the QAM symbol regeneration. In the same way that we use a number of passes through the DFE, we can pass the partially decoded data through the error corrector a number of times, effectively increasing the power of the system. If, as occurs most of the time, the LE has been used, we store the decoded data in an array ready for deinterleaving. If the OSWE has been used then in addition to storing the decoded data in this array, we store both the incoming signal and a flag to identify that that block has been decoded by the OSWE. The blocks of data, be they from the LE or the OSWE, are deinterleaved and block decoded. Most deinterleaved blocks will have too many errors at this stage to allow correction, but if any correction does occur a marker is placed beside the corrected bits. The non-interleaved blocks which were decoded by the OSWE are then passed through the DFE as previously described but with the small modification that any bits that were marked as correct are not permitted to be altered by the DFE. Notice that differential coding cannot be used because if we have corrected a differentially decoded symbol we would know the correct difference between the previous and current symbol, but not the absolute values of these symbols. The penalty for using non-differential coding is not severe at high bit rates as the channel changes relatively slowly. A comparison of differential and non-differential (not FEC) coding for the system of the preferred embodiment is given in FIG. 13. We note that the performance of the two systems is virtually identical. This is because the gain achieved by differential coding, namely its ability to follow a rapidly changing channel, is offset by the 3 dB penalty that is inherent with differential coding. At these high transmission rates, the channel does not change so fast on a symbol by symbol basis compared to our studies [4] on the narrowband channel, and so differential coding becomes less important. After being passes through the DFE the data is again deinterleaved and another attempt made at error correction. This process continues for as many passes as are necessary. As we have a good idea of the number of errors, from the overload detector of the decoder, we can continue this interactive process until either there are not errors in the array, or no more errors have been removed since the previous pass. Convergence of the DFE is improved by the marking of the correct bits, helping to prevent it from making incorrect decisions. The performance of this system for the same BCH codes as before is shown in FIG. 14. As can be seen the overall effect is very similar to the more normal coding method of FIG. 12. Comparison of the two systems shows that there is a small gain of the order of 2–3 dB for most coding powers and SNRs. This is not a particularly large reward for the considerable increase in receiver complexity. This system would only be worth implementing if SNR or BER was at an absolute premium as regards cost.

The reason for the gain being small is probably that although the equalizer is now forced into a better convergence, the previous system was able to remove most of the errors from an unconverged equalizer, reducing the benefit of the system.

Diversity in a Wideband System

In a previous paper [2] we showed that second order diversity is beneficial in narrowband QAM. The selection or combination of the received signals from diversity receivers depends on their relative amplitudes. In a wideband system considered here, the scenerio is different. We would expect less benefit from space diversity because the time diversity inherent in a multipath environment is used to some extent in the equalization process. If we have two channels with different impulse responses then to implement switched diversity reception we must decide which channel has to be the most favourable response. This decision is governed by the equalizer's properties.

It is necessary to produce some figure of merit that relates to the likely number of errors for a given impulse response. With switched diversity we can then choose the channel with the least likelihood of errors, and with maximal ratio combining we weight the incoming channels by the likelihood of errors. In order to identify the types of impulse responses that are more likely to yield relatively low symbol error rates we conducted a series of simulations using a channel whose impulse response had three coefficients. We designate the magnitude of the strongest path by $a_0$, that of the next strongest path by $a_1$ and that of the weakest path by $a_2$. We arranged for the average power of the impulse response to be a constant, and observed that the lowest error rate was achieved when there was a dominant path $a_0$ and $a_1$ was significantly larger than $a_2$. For the situation when the two paths were approximately equal, fewer errors were incurred when the two smaller paths were equal compared to the two larger ones being equal. The highest error rate was when all the paths had the same magnitude. Accordingly we arranged our diversity system to rate an impulse response according to the system parameter $$r=((a_0/a_1)+(a_0/a_2)).F+(a_1/a_2) \tag{15}$$

where F is another system parameter which must exceed unity. The first term in r enables us to obtain a measure of the dominance of the strongest path $a_0$, while the second term, $(a_1/a_2)$ of the significance of the dominance of $a_1$ over $a_2$. For a number of channels, the one having the largest r will have the most favourably shaped impulse response and if all impulse responses have the same average power, will give the lowest BER. In general, the impulse responses will have differing average powers and so we modify our rating of a channel to $$R = a_0 r \quad (16)$$

as r deals in ratios and is only concerned with the shape of the impulse response. By multiplying r by the dominant coefficient $a_0$ we scale r appropriately. The BER was examined as the parameter F varied from 1 to 10, and was found to be relatively insensitive to the value selected. We opted for F=5, although the most important point was to make it larger than unity.

Armed with our algorithm R to rate the quality of a channel's impulse response, we conducted second-order diversity experiments. The two channels had impulse responses with three coefficients each. All three coefficients had magnitudes and phases which conformed to independent Rayleigh fading statistics. The PRBS sounding sequence was transmitted over both channels for each block of data and the channel impulse responses were estimated. The diversity branch whose impulse had the larger R was used in our switch diversity arrangements. The variation of BER as a function of channel SNR is displayed in FIG. 15 for this diversity system with a data rate of 8 MBd, i.e., 32 Mg/s. A bench-marker for the non-diversity condition is also shown. For a BER of $10^{-2}$ (no FEC is used here) the diversity yielded a reduction in $E_b/N_0$ of approximately 6 dB. For comparison we show the performance of the system which selects the incoming channel not by using R of Equation 16, but merely by selecting the impulse response with the strongest average power viz:

$$\hat{R} = a_0^2 + a_1^2 + a_2^2 \quad (17)$$

Figure 15:
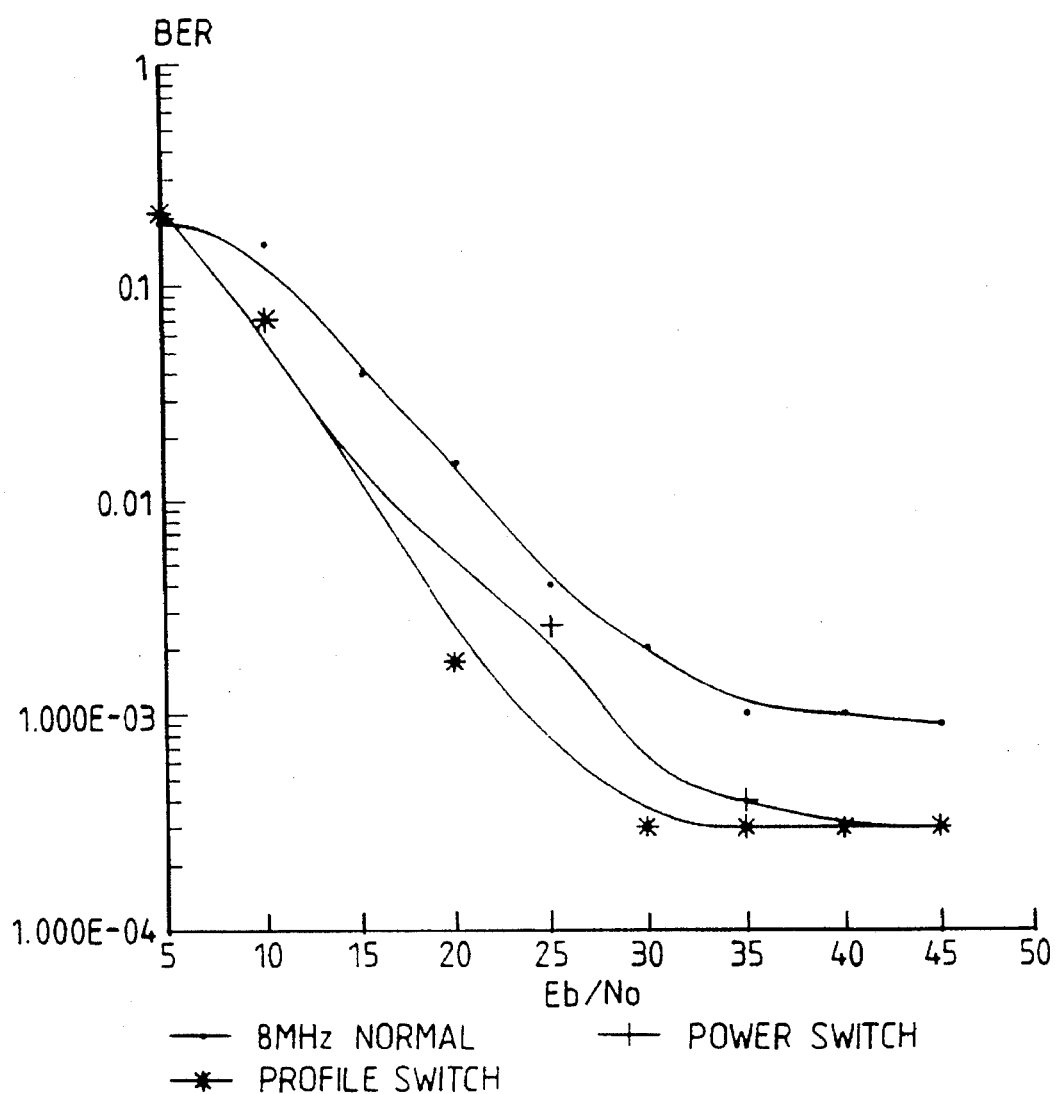
FIG. 15 is a graph illustrating BER performance with diversity.

The curves in FIG. 15 show that despite the inherent diversity in the multipath signal which is being exploited by our equalizer system of in FIG. 11, there were further significant gains to be made by introducing second-order spatial diversity. The method of selecting the impulse response using Equation 16 yielded the profile switch curve. This performed better than the conventional method of selecting the signal with the highest average power using $\hat{R}$ of Equation 17, the performance of which is labelled power switch curve in FIG. 15.

Implementation

The concatenated equalization system of the performed embodiment is more complicated than a simple LE but it need not have a significantly increased delay compared to the LE. This is because most of the operations can be performed in parallel. The delay imposed by each of the equalizers comprising the complete system is only the symbol delay imposed by each concatenated equalizer. This is of the order of the maximum time delay experienced by the last significant delay bin. Data can then be passed to the next concatenated equalizer whilst the previous equalizer operates on the next symbol. The 10 iterative loops through the DFE can be achieved by having 10 separate DFEs. This is not impractical as each of the DFEs are very simple, comprising only a short tapped delay line and a summer and quantiser.

Matters become more complex with the introduction of channel coding. The interleaving used was of the order of 6 ms for the simulations relating to the results depicted in FIG. 12 where a conventional FEC decoded operates on the equalized data. However, we note that if the multi-pass error decoding system is used then the delays build up considerably and it may not prove possible to process the data in real time. This system would be reserved for computer data where long delays can often be tolerated but low BERs are essential.

There has been little published work to date on equalizers for QAM transmission over dispersive fading channels in micro-cellular and indoor environments. Our investigations show that at a transmission frequency of 2 GHz, data at a rate of 8M symbols/s, corresponding to 32M bits/s, can be sent via 16-level QAM over wideband dispersive channels at an integrity acceptable in many applications. We found that in most instances a linear equalizer worked satisfactorily, but when the main component of the impulse response is in a deep fade it is advantageous to carry out a first pass equalization with a non-optimal equalizer and then use the result to prevent a DFE failing catastrophically. If this system is used in an iterative fashion, considerable improvement in BER are achieved. The system of this preferred embodiment incorporates three types of equalizers in a concatenated arrangement with switching between them as conditions in the fading channel change.

Second order spatial diversity brings about 5–7 dB gain in channel SNR over an equivalent uncoded system providing that it is implemented in an intelligent way, leading to a BER of $3 \times 10^{-4}$ at an $E_b/N_0$ ratio of 30 dB with no channel coding.

The use of channel coding provides very significant reductions in BER. With a ⅔ rate coder, BERs as low as $1 \times 10^{-5}$ are achieved for $E_b/N_0$ values as low as 20 dB, and if an iterative channel decoding approach is adopted then BERs of $1 \times 10^{-6}$ are realised for the same coding power and $E_b/N_0$ ratio, but at the cost of a considerable increase in complexity.

REFERENCES

[1] Carrier recovery for 16 level QAM in mobile radio—E. Issman, W. Webb, IEE colloquium on multi-level modulation 1990/045.

[2] 16 level circular QAM transmissions over a Rayleigh fading channel—W. Webb, R. Steele, ibid.

[3] Multi-level data transmissions over mobile radio channels—P. Martin, A. Bateman, ibid.

[4] Bandwidth-efficient QAM schemes for Rayleigh fading channels—W. Webb, R. Steele, IEE 5th Colloquium on Radio Receivers, July 1990.

[5] Delay doppler characteristics of multipath propagation at 910 MHz in a sub-urban mobile radio environment—D. Cox, IEEE trans Antennas and Propagation vol AP-20 No.5 September 1972.

[6] Wideband characteristics of fading mobile radio channels—J. Parsons, A. Bajwa, IEE proc 129 pt F No.2 April 1982.

[7] Laboratory testing of digital cellular radio systems—M. Hodges, S. Jensen, P. Tattersall, Br Telecom Technol J 8, No.1, January 1990.

[8] A comparison of the time delay spread measurements within two dissimilar office buildings—D. Devasirvatham, IEEE conf. on communications Canada, June 1986.

[9] Propagation characteristics on microcellular urban mobile radio channels at 910 MHz—R. Bultitude, G. Bedal, IEEE J-SAC Vol.7 No.1 January 1989.

[10] A comparison of indoor radio propagation characteristics at 910 MHz and 1.75 GHz—R. Bultitude, S. Mahmoud, W. Sullivan, ibid.

[11] Digital communications—J. Proakis, McGraw-Hill 1983.

[12] Towards a high-capacity digital cellular mobile radio system—R. Steele, Iee Proc Pt.F. Vo.132 No.5 August 1985 p.p.405–415.

I claim:

1. A digital radio system in which radio signals representing digital data symbols are transmitted over a radio channel using plural modulation levels, said digital radio system comprising:

a radio receiver for receiving a plural-level modulation radio signal;

a first symbol estimator which gives a first estimate of a symbol represented by said received plural-level modulation radio signal, a second symbol estimator which gives a second estimate of a symbol represented by said received plural-level modulation radio signal, and means for providing (a) the first estimate of a symbol from the first symbol estimator when the first and second symbol estimator outputs are the same or have a predetermined relationship and (b), at other times, a symbol output based on the output of the second symbol estimator.

2. A digital radio system as in claim 1 wherein said digital data symbols are transmitted using a multi-level modulation scheme and (a) the symbol output of the first estimator is provided as the radio system symbol output when the outputs of the first and second symbol estimators are both the same or each are neighbouring symbols in the modulation scheme and (b), at other times a symbol output is provided from the digital radio system based on the output of the second symbol estimator.

3. A digital radio system as in claim 2 wherein in the event of a discrepancy between the outputs of the first and second symbol estimators, an output is provided by selecting, from those symbols neighboring that given by the symbol output of the second estimator, the symbol that is closest to the symbol output of the first symbol estimator.

4. A digital radio system as in claim 1 wherein the provided radio system symbol output is used by the first symbol estimator in an iterative symbol estimation process.

5. A digital radio system as in claim 1 wherein the first symbol estimator comprises a differential feedback equalizer.

6. A digital radio system as in claim 1 wherein the second symbol estimator is a modified RAKE diversity combiner.

7. A digital radio system as in claim 1 wherein the receiver system has a third symbol estimator which is arranged to provide an output instead of that provided by the first and second symbol estimators when signals received by the receiver indicate a particular characteristic of the radio channel.

8. A digital radio system as in claim 7 wherein the third symbol estimator comprises a linear equalizer and the characteristic is whether channel sounding signals provide a convergent series of values for taps of the linear equalizer.

9. A method of processing received plural-level modulation signals representing digital data symbols in a digital radio system, said method comprising:

making a first estimate of a symbol represented by a received plural modulation level signal, making a second estimate of a symbol represented by said received plural modulation level signal and providing as a symbol output of the radio system (a) the first symbol estimate when the first and second symbol estimates are the same or have a predetermined relationship and (b), at other times the second symbol estimate.

10. A method of processing a received plural-level modulation signal in which:

the received plural-level modulation signal is processed (a) by a first symbol estimator which gives a first estimate of a symbol represented by said received plural-level modulation signal and (b) by a second symbol estimator which gives a second estimate of a symbol represented by said received plural-level modulation signal, the output of the first symbol estimator being provided as the received symbol output when the first and second estimated symbol outputs are the same or have a predetermined relationship and, the output provided as the received symbol output is at other times based on the estimated symbol output of the second symbol estimator.

* * * * *